United States Patent
O'Mahony et al.

(10) Patent No.: US 7,703,023 B2
(45) Date of Patent: Apr. 20, 2010

(54) MULTIPERSONA CREATION AND MANAGEMENT

(75) Inventors: Allison O'Mahony, Redmond, WA (US); Martin J. Hall, Seattle, WA (US); Michael C Kunz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 11/227,008

(22) Filed: Sep. 15, 2005

(65) Prior Publication Data

US 2007/0061730 A1    Mar. 15, 2007

(51) Int. Cl.
*G06F 3/048* (2006.01)
*G06F 3/00* (2006.01)

(52) U.S. Cl. .................. 715/745; 715/706; 715/741; 715/744; 715/751

(58) Field of Classification Search .............. 715/706, 715/747, 753, 745, 751, 752, 741, 744; 709/204
See application file for complete search history.

(56) References Cited

U.S. PATENT DOCUMENTS

| 6,014,135 | A  | * | 1/2000  | Fernandes ............... 715/744 |
| 6,487,584 | B1 | * | 11/2002 | Bunney .................. 709/206 |
| 6,512,525 | B1 | * | 1/2003  | Capps et al. ............ 715/762 |
| 7,472,277 | B2 | * | 12/2008 | Halcrow et al. .......... 713/175 |
| 2003/0120717 | A1 | * | 6/2003 | Callaway et al. ......... 709/201 |
| 2004/0148346 | A1 | * | 7/2004 | Weaver et al. ........... 709/204 |

* cited by examiner

*Primary Examiner*—Namitha Pillai
(74) *Attorney, Agent, or Firm*—Lee & Hayes, PLLC

(57) ABSTRACT

Multipersona creation and management is described. In one of a variety of examples, a system provides creation and management of multiple personas of a single user. Each of the personas, for instance, may have an associated external representation of the user, such as user tile, alias, email address, and so on. These personas may then be managed, both automatically and manually, to provide different external representations of the user as desired.

17 Claims, 5 Drawing Sheets

MULTIPERSONA CREATION AND MANAGEMENT

BACKGROUND

A user has access to a variety of different types of services, both locally and remotely over a network. For example, the user may shop at an ecommerce web site, write in a "blog", read and respond to messages in a message board, communicate using instant messages, send and receive email, and so on. In addition, the user may interact with a variety of different groups using each of these services. For example, the user may interact with a variety of social groups via instance messages, including work colleagues, college friends, high school friends, family friends, family members, and so forth.

To interact with the variety of services, the user may be required or find it desirable to "log on" to the service by providing sign-in credentials, such as a user name and password. Once the user is logged into traditional systems, however, the user is typically limited to a single representation of the user, such as a user tile, alias, and so forth. Thus, each other user, when logged into this traditional system, is presented with the same representation of the user. As previously described, however, the user may interact with a variety of different social groups, such as work colleagues and family members. Using such a traditional system, for instance, the work colleagues are presented with the same representation of the user as family members. Thus, a user may configure the representation to have limited "richness" such that the representation is generic to both social groups, thereby limiting the usefulness of the representation.

SUMMARY

Multipersona creation and management is described. In one of a variety of examples, a system provides creation and management of multiple personas of a single user. Each of the personas, for instance, may have an associated external representation of the user, such as user tile, alias, email address, and so on. These personas may then be managed, both automatically and manually, to provide different external representations of the user as desired. For instance, the user may provide a single sign-in credential to logon to a persona system having a plurality of external representations of the user, each being associated with a corresponding persona. The user may select between the personas for use in the same or different services without requiring the user to resubmit sign-in credentials. Additionally, the personas may be output automatically based on an association of the persona with other particular users. Thus, the user is provided with different external representations without being required to sign-in each time a different external representation is desired.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Figure 1:
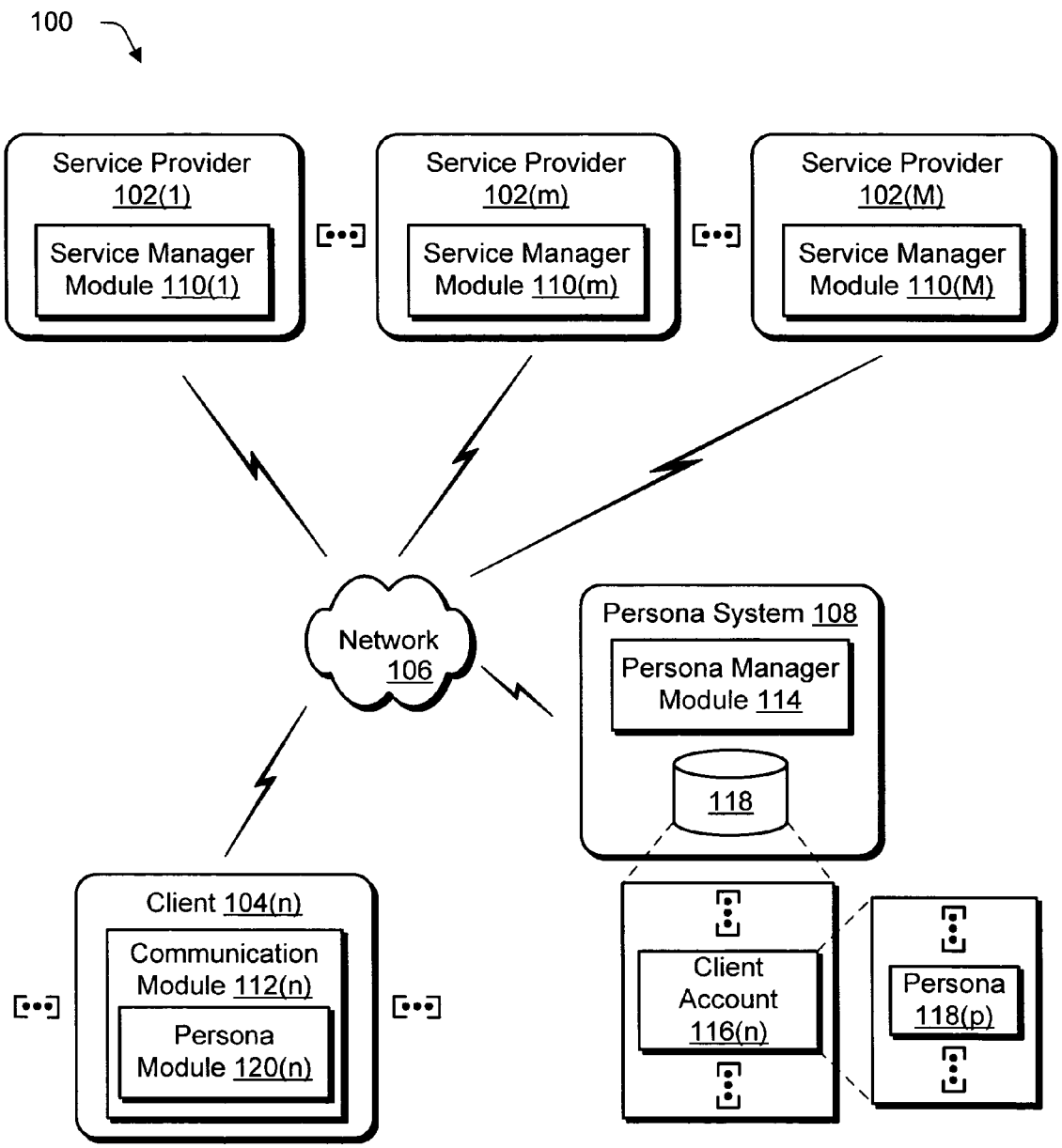
FIG. 1 is an illustration of an environment in an exemplary implementation that is operable to employ techniques for persona creation and management.

Currently, users interact with a variety of services for a variety of different purposes, including shopping, writing a bog, email, instant messaging, message boards, and so on. In addition, users often have a variety of groups with which they interact in different ways. For example, the user may interact with a group of coworkers differently than a group of family members. Typical services, however, support a single representation of the user, such as a user tile, alias, and other user information which is provided publicly to other users of the service.

Creation and management of personas is described such that the user may easily switch between personas when interacting with the same or different services. For example, a user account may be configured to contain centrally available non-publicly-viewable information of the user, such as overall account settings, security information, billing and payment information, aggregate information such as reputation of the user, and so on. The user account may also include a user interface and structure for a set of personas, each of which is configurable by the user to customize the look and information associated with the public view of the user. For example, personas may be created which include a user tile, contact information, reputation, persona information, email address, message board linking, and other network-based information associated with that persona. The personas may be stored in a persona system that is accessible via a single set of sign-in credentials, such as user name and password. Once signed-in, the user may then switch between personas without submitting additional sign-in credentials. For instance, when engaging in an instant messaging session a user may switch from a work-related persona having a formal picture and business contact information of the user to a family-related persona having a whimsical picture and home contact information. The personas may also be automatically managed, such that other users that are associated with a particular persona are provided with an external representation from that persona, e.g., specified coworkers receive external representations from a work persona while specified family members receive external representations from a family persona. Thus, the personas may be utilized to permit different levels of access to the user's information and provide different information to different users. In this way, the user may be provided with a central account management experience, such as through a single account having different personas available for external display, each of which is a different representation of a single user. A variety of other examples are also contemplated without departing from the spirit and scope thereof.

In the following discussion, an exemplary environment is first described which is operable to provide persona creation and management techniques. Exemplary procedures are then described which are operable in the exemplary environment, as well as in other environments.

Exemplary Environment

FIG. 1 illustrates an environment 100 in an exemplary implementation that is operable to employ techniques for persona creation and management. The illustrated environment 100 includes a plurality of service providers 102(1), 102(m), ..., 102(M) and a plurality of clients 104(n) (where "n" can be any integer from one to "N") which are communicatively coupled, one to another, via a network 106. The clients 104(n) may be configured in a variety of ways for network access. For example, one or more of the clients 104(n) may be configured as a computing device, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to low-resource devices with limited memory and/or processing resources (e.g., traditional set-top boxes, hand-held game consoles). The clients 104(n) may also relate to a person and/or entity that operate the clients. In other words, one or more of the clients 104(n) may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, service provider 102(1) may be communicatively coupled to a persona system 108 via a corporate intranet and also be communicatively coupled to the clients 104(n) via the Internet. A wide variety of other instances are also contemplated.

As previously described, service providers 102(1)-102(M) may be configured in a variety of ways to provide a wide variety of services. For example, one or more of the service providers 102(1)-102(M) may be configured to provide instant messaging, email communication (i.e., as an email provider), message boards, newsgroups, and so on. To provide these services, each of the service providers 102(1)-102(M) is illustrated as having a respective service manager module 110(1)-110(M). In an implementation, the service manager modules 110(1)-110(M) are executable to provide services to the plurality of clients 104(n) over the network 106, such as through configuration as web services.

The clients 104(n), when interacting with one or more of the service providers 102(1)-102(M), may be provided with the ability to specify an external representation. For example, the external representation may be configured as a user name and password which enables the client 104(n) to access the service providers 102(1)-102(M) by "logging on" to the respective services, and thus, is used to represent the client 104(n) to the service providers 102(1)-102(M).

The external representations may also be configured to represent the client to other clients accessing the service. For instance, the plurality of clients 104(n) may access service provider 102(m) which in this instance is configured to provide instant messaging through execution of a respective communication module 112(n). Each of the clients 104(n) may specify a user tile (e.g., an avatar) and an alias to represent the respective client to other clients participating in the instant messaging session. Thus, each of the clients 104(n), when participating in the instant messaging session, is provided with an external representation of the other clients participating in the session, and therefore may readily determine who sent a message and specify who is to receive a message. Although the communication module 112(n) was described as being executed for use in instant messaging, the communication module 112(n) may be configured in a variety of ways to access the service providers 102(1)-102(M) over the network 106, such as a web browser.

The persona system 108 is illustrated as communicatively coupled to the network 106 and is accessible by the client 104(n) and/or the plurality of service providers 102(1)-102(M). The persona system 108 includes a persona manager module 114 that is executable to manage a plurality of client accounts 116(n) which are depicted as stored in storage 118. In the illustrated implementation, each of the plurality of clients 104(n) is provided with a respective client account 116(n) that includes data utilized by the respective client 104(n) to represent the client 104(n) to one or more of the plurality of service providers 102(1)-102(M), such as to logon to the service providers 102(1)-102(M).

Each of the client accounts 116(n) is further illustrated as having a plurality of personas 118(p) (although "p" can be any integer from one to "P") which are configured to provide different external representations of the respective client 104(n). For example, one of the personas 118(p) may be configured as a work-related representation while another one of the personas 118(p) may be configured as a "personal" representation, such as to family and friends. Thus, each of the plurality of clients 104(n) may create different personas 118(p) to provide different external representations of the respective clients 104(n) for a variety of different situations, further discussion of which may be found in relation to FIGS. 3-5.

The client 104(n) is also illustrated as including a persona module 120(n), which in this instance is depicted within the communication module 112(n) to indicate that the communication module 112(n) may utilize the functionality represented by the persona module 120(n). In an implementation, the persona module 120(n) is executable to communicate with the persona system (and more particularly the persona manager module 114) to create and manage the personas 118(p) in the client account 116(n). In another implementation, the persona module 120(n) includes the functionality of the persona manager module 114 and the personas 118(p). In other words, the functionality of the persona system 108 may be incorporated locally on the client 104(n). A variety of other examples are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the persona creation and management techniques described below are platform-independent, meaning that the techniques may be implemented on a variety of commercial computing platforms having a variety of processors.

Figure 2:
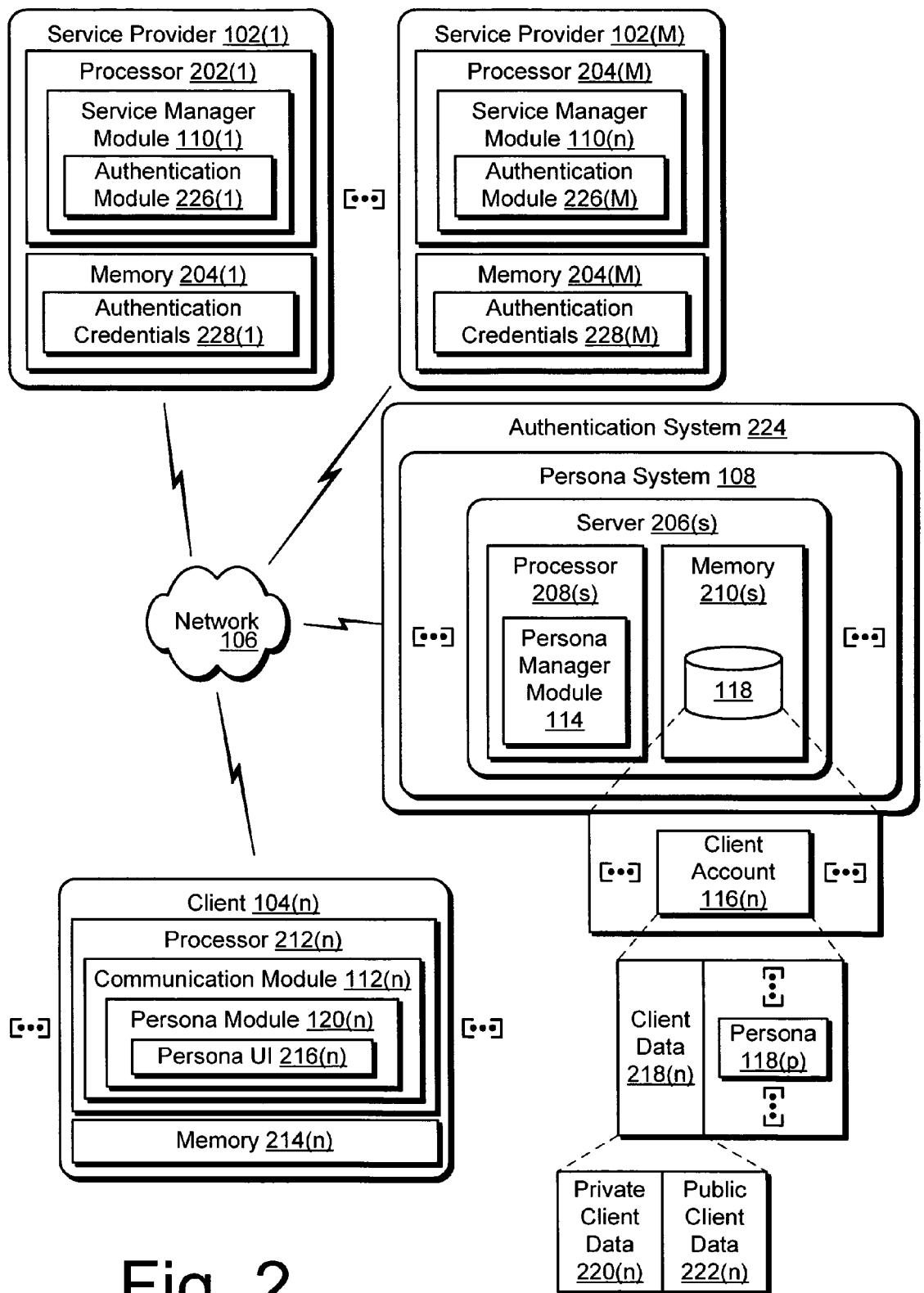
FIG. 2 is an illustration of a system in an exemplary implementation showing a plurality of service providers, clients and a persona system of FIG. 1 in greater detail.

FIG. 2 is an illustration of a system 200 in an exemplary implementation showing the plurality of service providers 102(1)-102(M), the client 104(n) and the persona system 108 in greater detail. The plurality of service providers 102(1)-102(M) are each illustrated as being implemented as a server having a respective processor 202(1)-202(M) and a respective memory 204(1)-204(M). The persona system 108 is illustrated as being implemented by a plurality of servers 206(s) (although "s" can be any integer from one to "S") having respective processors 208(s) and memories 210(s). Likewise, the client 104(n) is illustrated as a client device having a processor 212(n) and memory 214(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204(1)-204(N), 210(s), 214(n) is shown, respectively, for the service providers 102(1)-102(M), server 206(s) and client 104(n), a wide variety of types and combinations of memory may be employed, such as random access memory (RAM), hard disk memory, removable medium memory, and other types of computer-readable media.

The client is illustrated as executing the communication module 112(n) and the persona module 120(n) on the processor 212(n), both of which are storable in memory 214(n). The persona module 120(n) is representative of functionality that is accessible by the client 104(n) to create and manage personas. For example, the persona module 120(n), when executed, may provide an output of a persona user interface (UI) 216(n) to be rendered for viewing. The persona UI 216(n) may accept inputs, for instance, which are communicated over the network 106 for receipt by the persona manager module 114 of the persona system 108. The inputs may be utilized to create and manage personas by the client 104(n).

The persona system 108, for instance, may accept a single sign-in credential (e.g., user name and password) from the client 104(n) to allow access to the corresponding client account 116(n). The client account 116(n) in this instance is centrally-available over the network 106 to the service providers 102(1)-102(M) and the clients 104(n). The client account 116(n) is illustrated as having two portions, a first portion holding client data 218(n) and a second portion holding the plurality of client personas 118(p) of the client 104(n). The client data 218(n) may include a variety of data, such as private client data 220(n) (e.g., overall account settings, security information, billing and payment information, aggregate information such as reputation, and so on) and public client data 222(n), such as data that the client 104(n) permits exposure of publicly via one or more of the personas 118(p), such as contact information, alias, user tile, presence, presence persona, and so on.

The personas 118(p) may be utilized in a variety of ways. For instance, as previously described the client 104(n) may logon to the persona system 108 using a single sign-in credential. The persona system 108 may be incorporated as part of an authentication system 224, as illustrated in FIG. 2, such that the client 104(n), once signed-in, may access services provided by service providers 102(1)-102(M) which support the persona service. One example of such an authentication system 224 is the MICROSOFT PASSPORT system (MICROSOFT and PASSPORT are trademarks of the Microsoft Corporation, Redmond, Wash.). For instance, when the service provider 102(1) needs to authenticate the client 104(n), the service provide may execute an authentication module 224(1) which communicates with the authentication system 224 (e.g., the Microsoft Passport System) to authenticate the identity of the client 104(n). Thus, the service provider 102(1) may delegate authentication of the client 104(n) to the authentication system 224. In this example, the client 104(n) may "roam" between the service providers 102(1)-102(M) without reentering sign-in credentials.

In another example, however, authentication is performed locally by each of the service providers 102(1)-102(M) through use of respective stored authentication credentials 228(1)-228(M) by the respective authentication modules 226(1)-226(M). Therefore, in this other example the persona system 108 and the functionality represented by the persona system 108 are provided separately from the authentication system 224. A variety of other examples are also contemplated.

Management of the personas 118(p) may be performed in a variety of ways. Continuing with the previous example, once the client 104(n) has provided a single sign-in credential to the persona system 108, the client 104(n) may manually select (through interaction with the persona UI 216(n)) which of the plurality of personas 118(p) are to be utilized to provide an external representation of the client 104(n). Further, the client 104(n) may manually switch between the personas 118(p) as desired without resubmitting the sign-in credentials. For instance, the client 104(n) may select one of the personas 118(p) to participate in an instant messaging session with coworkers and another one of the personas 118(p) to participate in an instant messaging session with family members.

In another example, the personas 118(p) may be managed automatically. For example, the client 104(n) may specify particular personas 118(p) for use with particular service providers 102(1)-102(M), particular other clients, and so on. For instance, when the user attempts to access a service provider 102(1), a persona 118(p) which is specified for that particular service provider 102(1) may be utilized automatically and without user intervention, such as through execution of the persona manager module 114 and/or the persona module 120(n). Further, such automatic management may be incorporated within an authentication system as previously described such that the client 104(n) may "roam" from service provider to service provider and have access and a corresponding persona provided automatically. For instance, once the client is signed in to the authentication system 224, the user may access service providers 102(1)-102(M) which support authentication provided by the authentication system and may switch personas without resubmitting credentials. A variety of other examples of persona management are contemplated without departing from the spirit and scope thereof, further discussion of persona management may be found in relation to the following figures.

Exemplary Procedures

The following discussion describes persona creation and management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
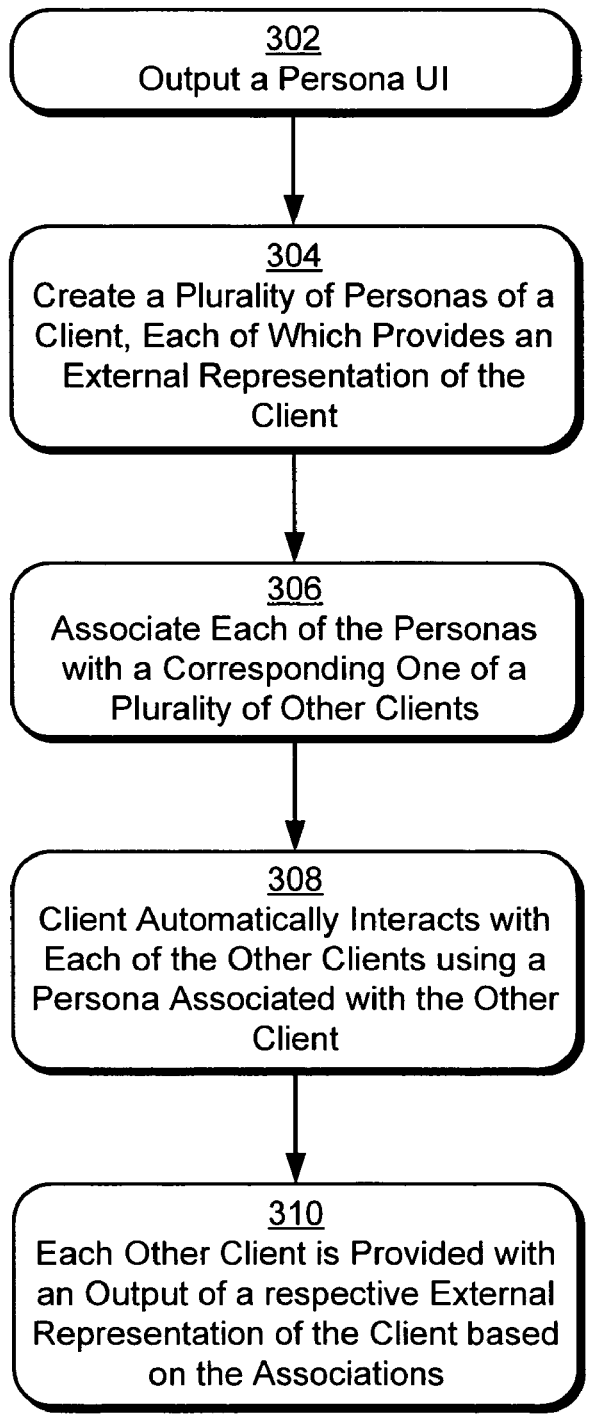
FIG. 3 is a flow diagram depicting a procedure in an exemplary implementation in which personas are created to represent a client and are automatically managed during interaction of the client with other clients.

FIG. 3 depicts a procedure 300 in an exemplary implementation in which personas are created to represent a client and are automatically managed during interaction of the client with other clients. A persona UI is output (block 302) that supports user interaction to create and manage personas. For example, the persona UI may be rendered on a display device such that a user may interact with the UI via a cursor control device, keyboard, and so on.

A plurality of personas of a client are created, each of which provides an external representation of the client (block 304). For example, a user tile, network address, contact information, and so on may be specified for each of the personas such that each persona is different, one to another.

Each of the personas are then associated with a corresponding one of a plurality of other clients (block 306). The client, for example, may create a work persona and a home persona. The client may then associate coworkers with the work persona (e.g., such as by specifying a network address, alias, and so on) and family members with the home persona.

The client may then automatically interact with each of the other clients using a persona associated with the other clients (block 308). Therefore, each other client is provided with an output of a respective external representation of the client based on the associations (block 310). Continuing with the previous example, the client may interact with each of the other clients via instant messages. Each of the coworkers may interact with the client via the work persona, and are therefore presented with the external representation corresponding to the work persona, such as a work user tile, work contact information, and so on. During this instant messaging with the coworkers, the client may also interact with family members via the home persona. Therefore, the family members are provided with an external representation corresponding to the homer persona, such as a casual photo of the client, home contact information, and so forth. In this example, the personas are selected automatically and without user interaction, and thus the user does not need to manually select which persona is utilized to interact with each client. In another example, however, the user may manually select, such as when another client that does not have an association interacts with the client, although a default persona may also be specified such that manually selection is not utilized. A variety of other examples are also contemplated without departing from the spirit and scope thereof.

Figure 4:
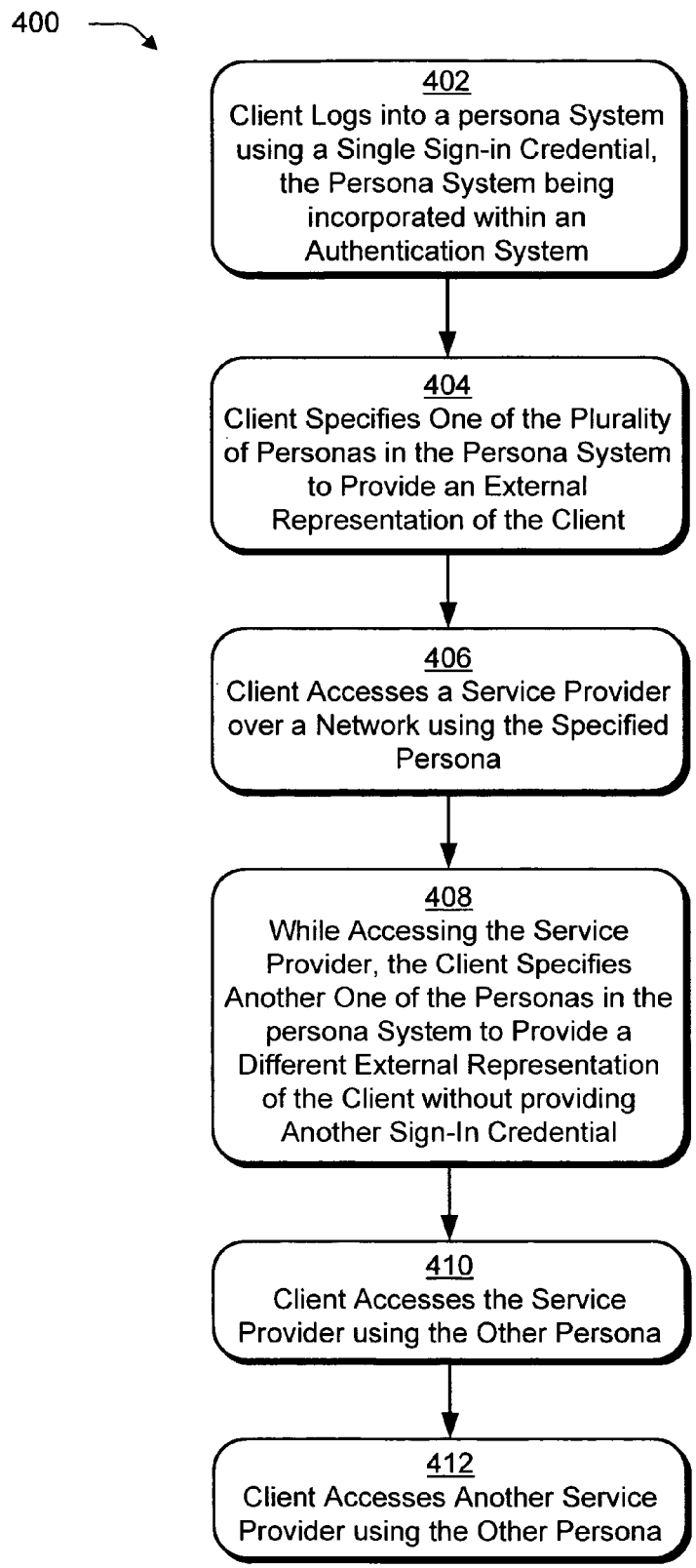
FIG. 4 is a flow diagram depicting a procedure in an exemplary implementation in which personas associated with an authentication system are utilized to provide multiple external representations of a client using a single sign-in credential.

FIG. 4 depicts a procedure 400 in an exemplary implementation in which personas associated with an authentication system are utilized to provide multiple external representations of a client using a single sign-in credential. A client logs into a persona system using a singe sign-in credential, the persona system being incorporated within an authentication system (block 402). For example, client 104(n) may logon to a respective client account 116(n) of the authentication system 224 by providing a user name and password. Thus, in this instance, the single user credential includes two portions, although other portions may also be included, such as a user account number, social security number, and so on.

The client specifies one of the plurality of personas in the persona system to provide an external representation of the client (block 404). The client 104(n), for instance, may output a persona UI 216(n) that enables the client 104(n) to select one of the plurality of personas 118(p), such as a persona configured for work-related activities. The work-related persona in this instance may include a work-related network address of the client 104(n) (e.g., an email address), a work-alias related alias (e.g., formal name of the client 104(n)), work address, and so on.

The client then accesses a service provider over a network using the specified persona (block 406). For example, the client 104(n) may navigate to a service provider 102(1) that delegate's authentication to the authentication system 224. Once authenticated, the specified persona may be utilized as an external representation of the client 104(n), such as to other clients that access the service provider 102(1) and/or to the service provider 102(1) itself.

While accessing the service provider, the client specifies another one of the personas in the persona system to provide a different external representation of the client without providing another sign-in credential (block 408). The client 104(n), for instance, may interact with a persona UI 216(n) which communicates with the persona system 108 to specify a different one of the personas 118(p) in the client account 116(n). Continuing with the previous example, the client 104(n) may switch from the work persona (specified in block 404) to a personal persona having a home network address of the client 104(n) (e.g., an email address), a personal alias (e.g., nickname of the client 104(n), home address, and so on.

The client may then access the service provider using the other persona (block 410). For instance, in an instant messaging session each participant may then be provided with the specified personal external representation of the client 104(n). Additionally, the client may then access another service provider using the other persona (block 412) without providing additional sign-in credentials. For instance, the other service provider may also delegate authentication to the authentication system 224. Therefore, in such an instance, the client 104(n) may switch service providers without again providing sign-in credentials.

Figure 5:
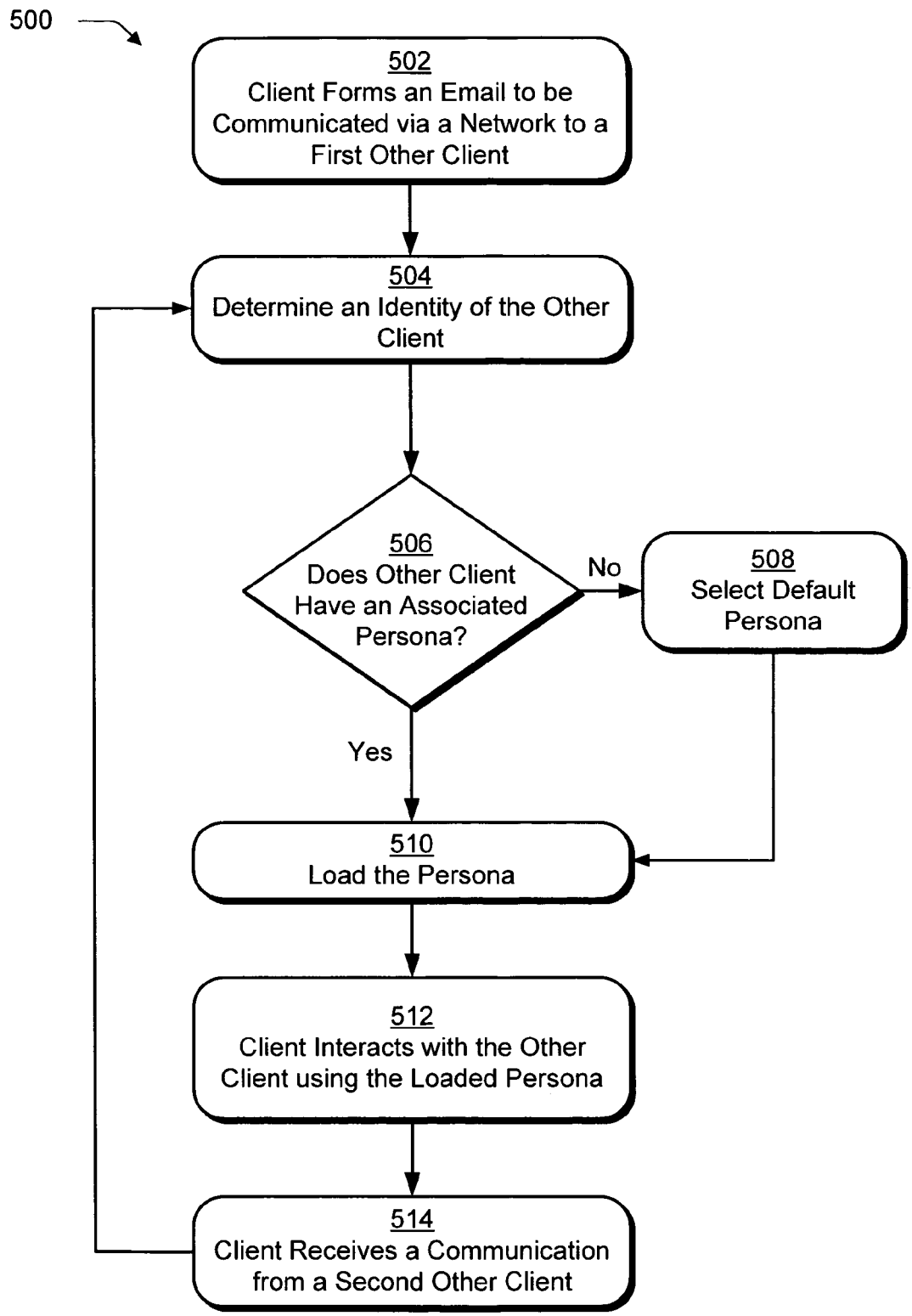
FIG. 5 is a flow diagram depicting a procedure in an exemplary implementation in which personas are automatically managed during interaction with different services based on an identity of other clients, with which, the client interacts.

FIG. 5 depicts a procedure 500 in an exemplary implementation in which personas are automatically managed during interaction with different services based one an identity of other clients, with which, the client interacts. A client forms an email to be communicated via a network to a first other client (block 502). For example, the client 104(n) may execute the communication module 112(n) and form an email for communication to another one of the plurality of clients.

An identity of the other client is determined (block 504). For instance, the persona module 120(n) may be executed to query the header of the formed email to determine an intended recipient of the email.

A determination is then made as to whether the other client has an associated persona (decision block 506). The persona module 120(n), for instance, may determine whether one of the plurality of personas has been associated with the identified client, such as by matching user aliases, network addresses, domains, and so forth.

When the other client does not have an associated persona ("no" from decision block 506), a default persona is selected (block 508), otherwise, the associated persona is selected. The persona is then loaded (block 510 and "yes" from decision block 506) and the client interacts with the other client using the loaded persona (block 512) as previously described.

During interaction with the other client, the client may receive a communication from a second other client (block 514). For instance, the client may receive an instant message from the second other client. A portion (blocks 504-512) of the procedure 500 may then be repeated such that the second other client may interact with the client using a corresponding persona. Thus, the persona system 108 may automatically provide associated personas for use by the client 104(n) even during the use of different types of communication.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:

associating each of a plurality of personas of a client with a corresponding one of a plurality of other clients comprising a first client and a second client, wherein each persona:

provides an external representation of the client;

is configured for use with a plurality of service providers over a network, the plurality of service providers providing a plurality of services of different types comprising a first service of a first type and a second service of a second type; and is accessible via a client account using a single sign-in credential provided via a client computer, wherein the client account is managed by a persona manager module as part of an authentication system located on the network and the client account includes client data to represent the client to the plurality of services of different types, the authentication system being separate from at least one of the service providers and the client computer; and automatically interacting with the first client in the first service using the corresponding persona associated with the first client and interacting with the second client in the second service using the corresponding persona associated with the second client through the authentication system, wherein the authentication system is configured such that, once the client is signed-in to the first type of service using the single sign-in credential, each of the plurality of services of different types including the second service is accessible to the client without the client submitting an additional sign-in credential.

2. A method as described in claim 1, wherein the automatically interacting is performed via one or more of the plurality of service providers.

3. A method as described in claim 2, wherein each service provider is a web service.

4. A method as described in claim 1, wherein the automatically interacting includes selecting the corresponding persona associated with the other client without user intervention and communicating with the other client using the respective external representation of the corresponding persona.

5. A method as described in claim 1, wherein the automatically interacting includes communicating with the first client and the second client using respective personas without manually specifying the respective personas during the interaction.

6. A method as described in claim 1, wherein the different types of services comprise:

an instant messaging service;
an email service;
a message board service; and
a newsgroup service.

7. A method comprising:

accessing a client account using a single sign-in credential provided via a client computer, wherein the client account:

is accessible on a centralized persona system via a network, the centralized persona system having a plurality of client accounts;

includes a plurality of personas, each persona having a first portion that contains non-publicly viewable information of the client and a second portion containing publicly viewable information of the client, wherein each persona:

provides a different external representation of the client;

is configured for use with a plurality of service providers that provide a plurality of services of different types; and is associated with a respective one of a plurality of other clients, each respective one of the plurality of other clients using one of the plurality of services of different types; and outputting one or more external representations during interaction of the client with the plurality of other clients within the plurality of services of different types provided by the plurality of different service providers, wherein each service provider:

is automatically accessible by the client via an authentication system including the centralized persona system having the client account, wherein the authentication system is separate from the client computer and at least one of the plurality of different service providers; and delegates authentication of the client to the authentication system, from which the authentication system, via the network, authenticates each external representation prior to interaction of the client with each service provider, the outputting including:

switching between the external representations during interaction of the client with one or more of the plurality of service providers without the client submitting additional credential to be signed in to the respective one of the plurality of services once the client has submit a single sign-in credential and has been signed in to a previous one of the plurality of services through the client account; and automatically managing the outputting of a respective external representation based on the association with a respective one of the plurality of other clients.

8. A method as described in claim 7, wherein the plurality of services of different types comprises:

instant messaging service;
email service;
message board service; and
newsgroup service.

9. A method as described in claim 7, wherein each persona includes a user tile and contact information.

10. A method as described in claim 7, wherein the switching is performed manually through interaction with a user interface.

11. A method as described in claim 7, wherein the switching is performed automatically without user intervention.

12. A method as described in claim 7, wherein the authentication system is configured such that once the client is signed-in using the single sign-in credential, each service provider is accessible to the client without submitting another sign-in credential.

13. A system comprising:

a processor:

a memory coupled to the processor, wherein the processor is implemented to perform actions comprising:

forming a communication, in a first service of a plurality of services of different types, from a local client to a first client through a network, the plurality of services each being provided by one of a plurality of service providers respectively and the plurality of services comprising the first service and a second service different from the first service;
determining an identity of the first client;
loading, upon determining the identity of the first client, one of a plurality of persona from a client account of the local client, wherein:
  the one of the plurality of personas is associated with the identity of the first client;
  each of the plurality of personas provides an external representation of the local client; and
  each of the plurality of personas is used during interaction between the local client and the plurality of services over the network;
interacting between the local client and the first client using the one of the plurality of personas associated with the first client, the interacting being conducted in the first service and comprising using a single sign-in credential to sign the local client in to the first service via the client account of the local client, the client account being managed by a persona manager module as part of an authentication system separate from the system, wherein once the local client is signed in to the first service via the client account, each of the plurality of services is accessible to the local client;
receiving another communication from the second service of the plurality of services via the network, the other communication being sent by a second client using the second service;
determining an identity of the second client;
loading, upon determining the identity of the second client, another persona of the plurality of personas from the client account of the local client, wherein the other persona of the plurality of personas is associated with the identity of the second client;
interacting between the local client and the second client using the other persona associated with the second client, the interacting being conducted in the second service and comprising the local client having access to the second service without the local client submitting additional credential to sign in to the second service.

14. A system as described in claim 13, wherein the plurality of services are provided by a plurality of service providers separate from the local client, the first client and the second client.

15. A system as described in claim 13, wherein the plurality of services comprise:
  an instant messaging service;
  an email service;
  a message board service; and
  a newsgroup service.

16. One or more computer-readable storage medium having stored thereon a plurality of instructions that, when executed on a computing device having one or more processors, cause the one or more processors to implement the method as recited in claim 1.

17. One or more computer-readable storage medium having stored thereon a plurality of instructions that, when executed on a computing device having one or more processors, cause the one or more processors to implement the method as recited in claim 7.

* * * * *